(12) United States Patent
Kim

(10) Patent No.: US 8,578,607 B2
(45) Date of Patent: Nov. 12, 2013

(54) METHOD OF DESIGNING SPOKES OF NON-PNEUMATIC TIRE

(75) Inventor: Yong Hun Kim, Seoul (KR)

(73) Assignee: Hankook Tire Co., Ltd., Seoul (KR)

( * ) Notice: Subject to any disclaimer, the term of this patent is extended or adjusted under 35 U.S.C. 154(b) by 127 days.

(21) Appl. No.: 13/189,459

(22) Filed: Jul. 22, 2011

(65) Prior Publication Data

US 2012/0144674 A1  Jun. 14, 2012

(30) Foreign Application Priority Data

Dec. 13, 2010 (KR) ........................ 10-2010-0126956

(51) Int. Cl.
*B21K 1/34* (2006.01)
*B60B 9/00* (2006.01)
*B60C 7/00* (2006.01)

(52) U.S. Cl.
USPC ..................... 29/894.341; 29/894; 29/894.34; 29/894.342; 29/894.343; 152/5; 152/246

(58) Field of Classification Search
USPC ................ 29/894, 894.34, 894.341, 894.342, 29/894.343; 152/5, 246, 270
See application file for complete search history.

(56) References Cited

U.S. PATENT DOCUMENTS

| 1,979,935 A | * | 11/1934 | Henap ............................. 152/55 |
| 4,784,201 A | * | 11/1988 | Palinkas et al. ................ 152/323 |
| 2010/0132865 A1 | * | 6/2010 | Iwase et al. .................... 152/301 |

* cited by examiner

*Primary Examiner* — Sarang Afzali
(74) *Attorney, Agent, or Firm* — Blakely, Sokoloff, Taylor & Zafman LLP

(57) ABSTRACT

Disclosed herein is a method of designing spokes of a non-pneumatic tire which randomly arranges spokes around a circumference to optimize noise dispersion. The method of designing spokes of a non-pneumatic tire includes placing a plurality of spokes (2) holding and supporting a tread (1) to be radially installed around a circumference of the tire on a circular spoke support (3) under the tread (1) to be in contact with the ground, wherein the spokes (2) are arranged at three angles on the circular spoke support (3) around the circumference of the tire, the three angles being divided into a small angle (a), a medium angle (b) and a large angle (c), and the spokes (2) are arranged at irregular angles under a condition that a ratio (q) of the large angle (c) to the small angle (a) is greater than a ratio (p) of the medium angle (b) to the small angle (a).

1 Claim, 4 Drawing Sheets

METHOD OF DESIGNING SPOKES OF NON-PNEUMATIC TIRE

BACKGROUND OF THE INVENTION

1. Field of the Invention

The present invention relates to a method of designing spokes of a non-pneumatic tire. More particularly, the present invention relates to a method of designing spokes of a non-pneumatic tire which randomly arranges spokes around a circumference of the tire to optimize noise dispersion.

2. Description of the Related Alt

Generally, a non-pneumatic tire includes spoke members which are arranged at regular intervals and at an angle in a certain range between inner and outer cylindrical members. The non-pneumatic tire has empty support spaces between the spoke members and the support spaces are discontinuously arranged by the spoke members, thereby causing substantial noise during driving of a vehicle.

For the non-pneumatic tire, although the spoke member serves an important role in view of supporting a vehicle, a spoke supporting load has a narrow area, so that impact to a tire contacting the road is entirely transmitted to an axle of the vehicle during driving of the vehicle.

In order to overcome such a disadvantage, non-pneumatic tires as shown in FIGS. 3 and 4 are conventionally suggested. A non-pneumatic tire of FIG. 3 has spokes 102 designed into two parts, wherein the number of spokes 102 on an outer circular spoke support 103a, which is in contact with a tread 101, is about two times more than the number of spokes on an inner circular spoke support 103b disposed inside the outer circular spoke support 103a. In this case, excitation frequency occurring by rotation of the tire can be doubled, while reducing the extent of force applied through the wad 101 by half.

A non-pneumatic tire of FIG. 4 also has spokes 102 designed into two parts, wherein the number of spokes 102 on an outer circular spoke support 103a and the number of spokes 102 on an inner circular spoke support s 103b are the same, but the spokes on the outer circular spoke support 103a are designed in three parts in a transverse direction, so that force imparted to the tire contacting the ground is dispersed in view of frequency.

These conventional non-pneumatic tires disperse impact by changing the number of spokes which contact the ground.

SUMMARY OF THE INVENTION

The present invention is directed to solving the problems of the related art as described above, and an object of the present invention is to provide a method of designing spokes of a non-pneumatic tire, which arranges spokes at irregular angles around a circumference of the tire instead of changing the number of spokes, thereby dispersing impact when the tire contacts the ground.

In accordance with an aspect of the present invention, a method of designing spokes of a non-pneumatic lire includes: placing a plurality of spokes holding and supporting a tread to be radially installed around a circumference of the tire on a circular spoke support under the tread to be in contact with the ground, wherein the spokes are arranged at three angles on the circular spoke support around the circumference of the tire, the three angles being divided into a small angle (a), a medium angle (b), and a large angle (c), and the spokes are arranged at irregular angles under a condition that a ratio (q) of the large angle (c) to the small angle (a) is greater than a ratio (p) of the medium angle (b) to the small angle (a).

BRIEF DESCRIPTION OF THE DRAWINGS

The above and other aspects, features and other advantages of the present invention will be more clearly understood from the following detailed description taken in conjunction with the accompanying drawings.

DESCRIPTION OF THE EMBODIMENTS

Hereinafter, embodiments of the present invention will be described in detail with reference to the accompanying drawings.

Figure 1:
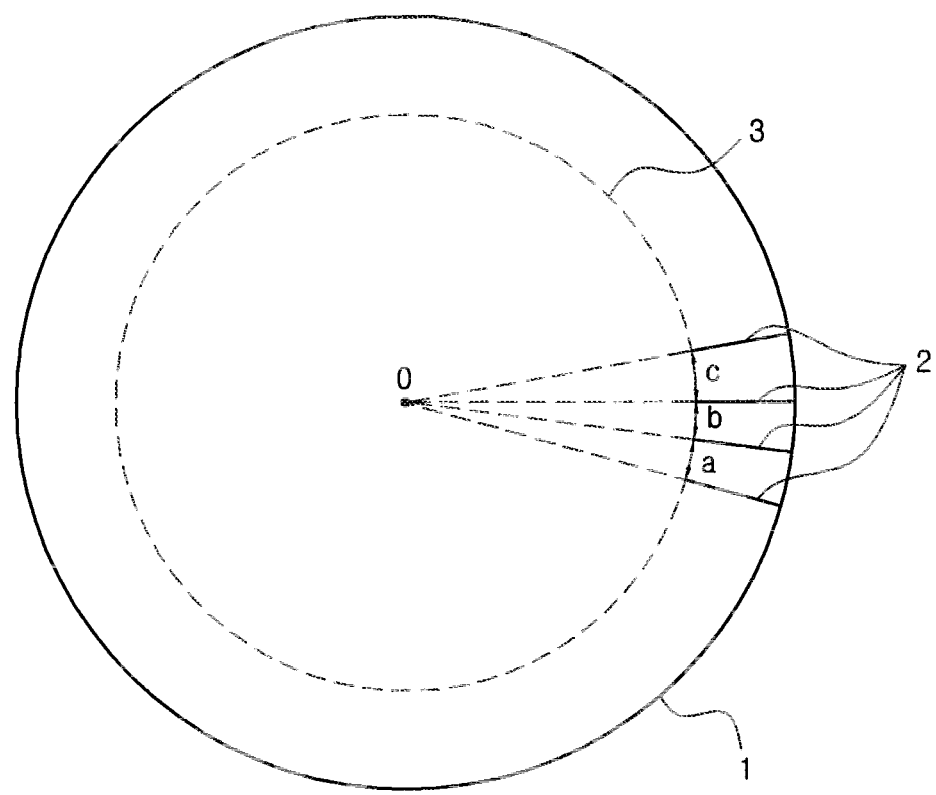
FIG. 1 is a schematic cross-sectional view of a tire illustrating a method of designing spokes of a non-pneumatic tire according to one embodiment of the present invention.

FIG. 1 illustrates a method of designing spokes of a non-pneumatic tire according to one embodiment of the present invention. The method of designing spokes of a non-pneumatic tire includes placing a plurality of spokes 2 holding and supporting a tread 1 to be radially installed around a circumference of the tire on a circular spoke support 3 under the tread 1 to be in contact with the ground. In this method, the spokes 2 are arranged at three angles on the circular spoke support 3 around the circumference of the tire. Here, the three angles may be divided into a small angle (a), a medium angle (b), and a large angle (c). Further, the spokes 2 are arranged at irregular angles under a condition that a ratio (q) of the large angle (c) to the small angle (a) is greater than a ratio (p) of the medium angle (b) to the small angle (a).

That is, the spokes 2 are properly arranged around the circumference of the tire between the circular spoke support 3 and the tread 1 at the small angle (a), the medium angle (b), and the large angle (c) only, thereby optimizing noise dispersion.

This arrangement provides effective dispersion of noise based on the same principle as optimal dispersion of pattern noise using a pitch sequence on the tire tread 1. The spokes 2 are properly arranged at the small angle (a), the medium angle (b), and the large angle (c) around the circumference of the tire, thereby obtaining such effect.

EXAMPLE

Figure 2:
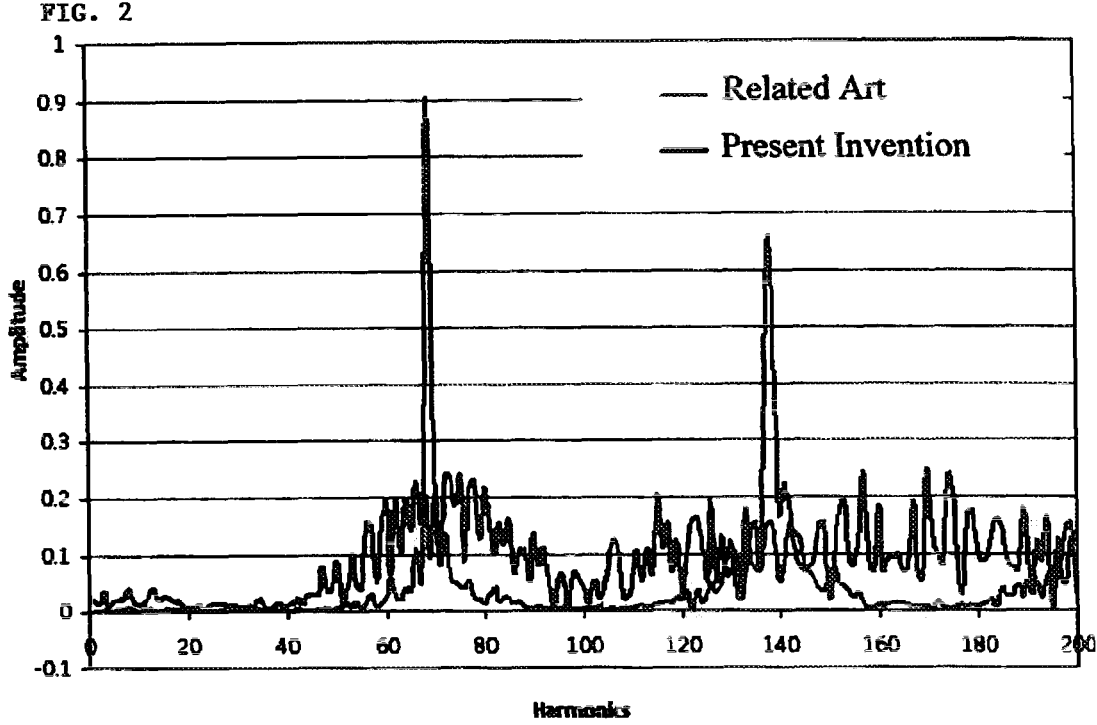
FIG. 2 is a graph illustrating relation of noise dispersion between conventional arrangement of spokes at a regular angle and arrangement of spokes according to the present invention.
Figure 3:
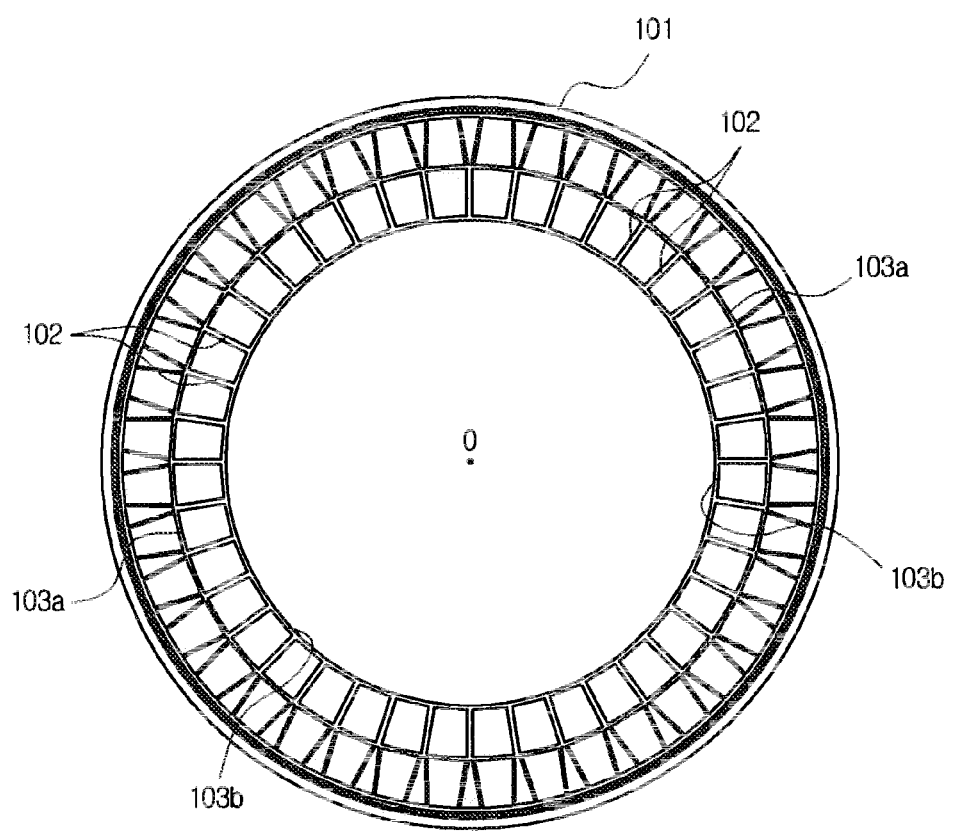
FIGS. 3 and 4 are cross-sectional views of conventional non-pneumatic tires having spoke members.
Figure 4:
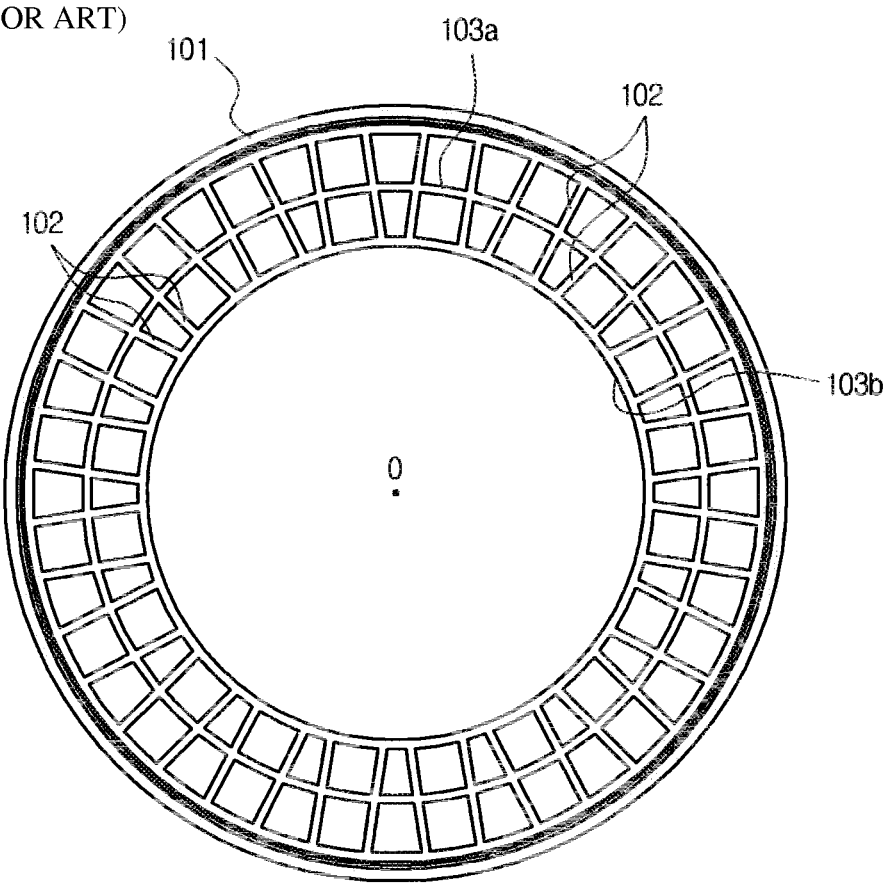

Under a condition that the small angle (a) of 4.388 degrees is defined as "1," the medium angle (b) of 5.524 degrees is defined as "2," and the large angle (c) of 6.588 degrees is defined as "3," when a total of 69 spokes 2 is placed around the circumference of the tire, an optimal arrangement in consideration of noise dispersion is as follows, and effects are illustrated in the graph of FIG. 2.

The total 69 spokes 2 are arranged at angles of "2 1 1 1 2 2 2 2 1 2 3 2 2 2 3 2 1 1 2 2 2 1 2 2 1 1 1 2 3 3 3 2 1 1 1 2 3 3 2 2 3 2 1 1 1 2 2 2 1 1 2 3 2 1 2 3 2 2 1 1 1 1 2 2 1 1 1 1" around the circumference of the tire.

As described above, the method of designing spokes of the non-pneumatic tire according to the invention irregularly arranges the spokes at three angles around the circumference of the tire to reduce noise of the non-pneumatic tire, thereby optimizing noise dispersion.

It should be understood that the embodiments and the accompanying drawings have been described for illustrative purposes, and the present invention is limited only by the following claims. Further, those skilled in the art will appreciate that various modifications, additions and substitutions are possible without departing from the scope and spirit of the invention according to the accompanying claims.

What is claimed is:

1. A method of designing spokes of a non-pneumatic tire, comprising:

placing of the spokes holding and supporting a tread to be radially installed around a circumference of the tire on a circular spoke support under the tread to be in contact with a ground, wherein the spokes are arranged at three different angles on the circular spoke support around the circumference of the tire in a random sequence of the three different angles, the three different angles being divided into a small angle, a medium angle and a large angle, and the spokes are arranged in the random sequence of the three different angles under a condition that a ratio of the large angle to the small angle is greater than a ratio of the medium angle to the small angle, and wherein the placing of the spokes consists of sixty nine spokes placed on the circular spoke support and arranged in the random sequence of the three different angles, wherein a random sequence of the sixty nine spokes comprises a sequence of spokes arranged by medium angle, small angle, small angle, small angle, medium angle, medium angle, medium angle, medium angle, small angle, medium angle, large angle, medium angle, medium angle, medium angle, large angle, medium angle, small angle, small angle, medium angle, medium angle, medium angle, small angle, medium angle, medium angle, small angle, small angle, small angle, medium angle, large angle, large angle, large angle, medium angle, small angle, small angle, small angle, medium angle, large angle, large angle, medium angle, medium angle, large angle, medium angle, small angle, small angle, small angle, small angle, medium angle, medium angle, medium angle, small angle, small angle, medium angle, large angle, medium angle, small angle, medium angle, large angle, medium angle, medium angle, small angle, small angle, small angle, small angle, medium angle, medium angle, small angle, small angle, small angle, small angle.

\* \* \* \* \*